Feb. 24, 1970 F. B. RYAN 3,497,016
SAW ACTION CUTTING EDGE FOR BLADES AND RIPPERS
Filed April 17, 1967
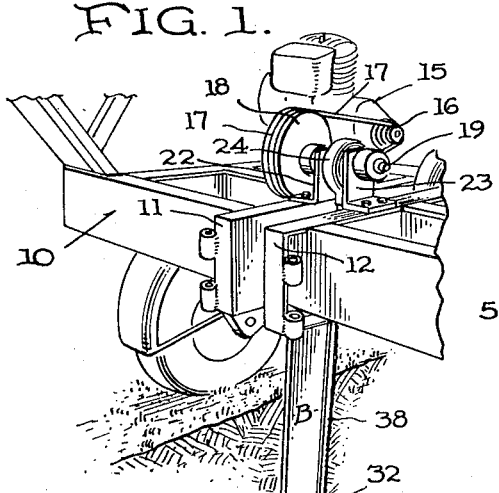
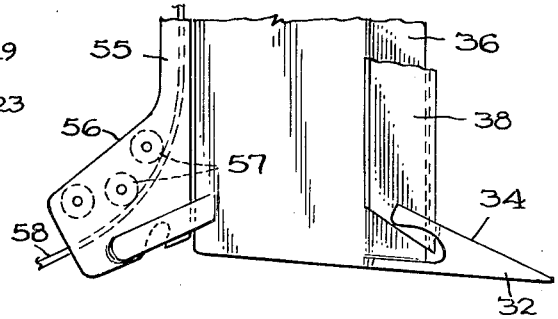
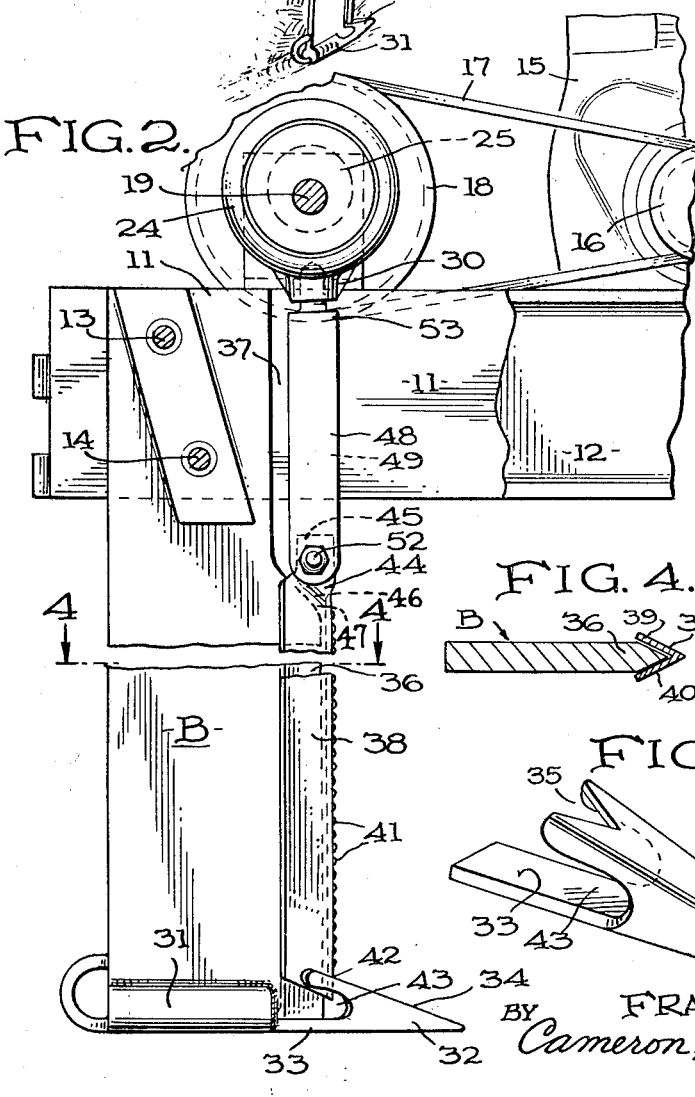
INVENTOR
FRANCIS B. RYAN
BY Cameron, Kerkam & Sutton
ATTORNEYS United States Patent Office 3,497,016
Patented Feb. 24, 1970

3,497,016
SAW ACTION CUTTING EDGE FOR
BLADES AND RIPPERS
Francis B. Ryan, P.O. Box 451,
Chariton, Iowa 50049
Filed Apr. 17, 1967, Ser. No. 631,411
Int. Cl. A01b *35/14, 35/26;* E02f *5/18*
U.S. Cl. 172—40                                        9 Claims

ABSTRACT OF THE DISCLOSURE

A vertically oscillating cutting edge for ditching and cable laying blades and rippers slidably mounted on the forward edge of a ditching blade and oscillated upwardly and downwardly thereon to implement passage of the ditching blade through the ground.

BACKGROUND OF THE INVENTION

This invention relates to ditching and cable laying blades which are supported beneath a trailer or other vehicle and which cut a ditch or slot in the ground beneath the vehicle to a desired depth for the laying of cable, wire or pipe under the surface of the ground in the foot of the cut made by the blade. Such blades are normally made with a sharpened or fixed tooth forward edge to facilitate passage of the blade through the ground beneath the vehicle as the vehicle moves forwardly. In the laying of cable, cable is pulled from a freely rotating drum mounted above the rear extremity of the vehicle over the blade and passes down the rear edge of the blade through an appropriate tube or housing and out at the rear foot of the blade into the bottom of the cut made thereby.

In the laying of pipe, the forward extremity of the chain of pipe is normally affixed to an appropriate ring or other means at the rear of the foot of the blade and is progressively pulled into the bottom of the cut made by the blade by the forward motion of the blade and vehicle.

The prior art discloses a number of pertinent patents, none of whih, however, discloses the concept of providing a vertically movable, oscillating cutting edge slidably mounted on the forward edge of the ditching blade and oscillated thereon through a driven eccentric or other means mounted on the vehicle, above the forward edge of the blade.

Thus, Patent Nos. 2,280,014 and 3,202,222 disclose fixed, separable cutting edges for ditching blades, which are sharpened and which may be removed from the blades for resharpening or replacement. In neither of these two patents is there any movement of the separable cutting edge.

Patent Nos. 3,183,979 and 3,296,985 disclose oscillating plows which are oscillated vertically, the entire plow being oscillated to facilitate penetration through the ground.

Patent No. 3,167,134 shows a powered mold board plow which is oscillated about a pivot point by means of an eccentric-actuated rocker arm to impart a lateral oscillating movement to the entire plow.

Lastly, Patent No. 3,238,646 discloses an excavating bucket structure in which a blade 14 is slidably mounted across the forward, lower extremity of the bucket, the blade being oscillated backwardly and forwardly by linkage, a bell crank assembly and an eccentric to ease penetration of the excavating bucket through the ground.

SUMMARY OF THE INVENTION

To summarize the invention, it broadly consists in the provision of a sharpened or toothed, V-shaped cutting edge, slidably fitted over the V-shaped forward edge of a ditching blade vertically disposed beneath a trailer vehicle and vertically oscillated thereon to ease penetration of the blade through the ground.

It is therefore an object of this invention to provide an improved ditching blade upon the forward edge of which is slidably mounted a vertically movable, V-shaped cutting edge, which may be straight or toothed and which is actuated through an eccentric and linkage to oscillate upwardly and downwardly on the forward edge of the main blade.

It is a further object of this invention to provide improved retaining means at the foot of the blade for slidably maintaining the cutting edge thereon.

It is another object of this invention to provide novel means for oscillating the cutting blade on the forward edge of the main ditching blade.

It is an object of this invention to provide improved drive means for the oscillating cutting edge of the blade.

Other and further objects of this invention will become apparent as this specification proceeds.

BRIEF DESCRIPTION OF THE DRAWING

Referring to the drawing, FIG. 1 is a fragmentary perspective view, taken from the right rear of the trailer and broken away, showing the ditching blade structure in operation and the actuating mechanism therefor; FIG. 2 is a side elevational view, partially broken away and in phantom, of the novel blade structure installed between the beams of the trailer, showing the drive for the eccentric controlling the oscillation of the cutting blade; FIG. 3 is a partial longitudinal elevational view, partially in cross section and broken away, showing the eccentric and housing, the shaft and the mounting therefor, the blade linkage and the cutting blade in operating position; FIG. 4 is a fragmentary cross-sectional view of the forward edge of the ditching blade and V-shaped cutting blade in position thereon; FIG. 5 is a perspective view, partially in phantom, of the notched toe structure for the foot of the ditching blade designed to receive the lower extremity of the cutting blade and FIG. 6 is a partial, side-elevational view of the foot portion of an alternative embodiment of the ditching blade designed for the laying of wire, cable or analogous materials.

DESCRIPTION OF THE PREFERRED EMBODIMENTS

In the drawings, FIG. 1, 10 designates the main frame or platform of the vehicle longitudinally of which are disposed parallel, vertical frame beams 11 and 12 between which is mounted, as by bolts or other appropriate means, the upper extremity of ditching blade B which is provided at its upper extremity with bolt holes 13 and 14 through which bolts are passed between beams 11 and 12 to maintain blade B in a vertical position, extending downwardly beneath beams 11 and 12 at the rear extremity of the trailer frame.

Mounted on the frame 10 forwardly of the blade assembly is a small gasoline or other engine 15 provided with a pulley 16 from which belt 17 passes over driven pulley 18 affixed at one extremity of shaft 19 which is rotatably mounted in ball bearing mountings on appropriate pillow block assemblies 20 and 21 affixed outwardly of the upper extremities of parallel brackets 22 and 23, which are vertically mounted as by bolts or other means, on the upper surfaces of beams 11 and 12, respectively, on each side of the space between beams 11 and 12 and above the forward edge of blade B.

Mounted over shaft 19 between brackets 22 and 23 is eccentric housing 24 within which is rotatably mounted off-center eccentric 25 by means of a ball bearing race 26 mounted between housing 24 and eccentric 25. As shown, eccentric 25 is keyed to shaft 19 by means of a key screw 27 provided in a screw threaded recess 28 in flange 29 of eccentric 25.

At its lower extremity eccentric housing 24 is provided with an extended, internally screw threaded orifice or projection 30, for a purpose hereinafter to be discussed at more length.

Referring now to FIG. 2, which is a partial side elevational view of the blade and actuating structure, it will be seen that the blade B is provided at its lower extremity with an appropriate foot 31 which may, as shown, be of cylindrical form for the laying of pipe, or of triangular cross-section for the laying of cable, wire or tape.

At its forward extremity, foot 31 of blade B is provided with toe means 32, the rear extremity 33 of which is preferably flattened and is affixed beneath the lower forward extremity of blade B and foot 31, as by welding or other appropriate means, to constitute toe 32 an extension of foot 31, extending forwardly therefrom in longitudinal alignment therewith. As shown, toe 32 is preferably wedge-shaped and is provided with a flattened, downwardly inclined and reduced upper surface 34, in the upper, rear extremity of which is provided V-shaped notch 35, for a purpose hereinafter to be discussed at more length. As shown, the interior of the toe 32 is recessed and open, between its lower, flattened extremity 33 and the rear portion of upper surface 34, beneath notch 35.

Blade B is cut back or recessed at its upper, forward edge at 37, for a purpose hereinafter to be discussed.

Cutting blade 38 is preferably formed of two angularly disposed, rectangular plates 39 and 40 of high strength alloy steel welded together along their forward, meeting edges, at an angle of some 30°. The forward, meeting edge of plates 39 and 40 may be sharpened or may be provided with a series of welded studs or teeth 41 evenly disposed therealong to provide a "saw" or abrasive edge for blade 38.

At its lower extremity 42, the forward edge of blade 38 is smooth and is designed to fit closely and slidably within conforming V-shaped notch 35 of the upper, rear surface 34 of blade toe 32, between notch 35 and the outer, lower surface 36 of blade B. The smooth lower extremity 42 of blade 38 is of a length greater than the "throw" of blade 38 to maintain its lower extremity 42 fully seated at all times within notch 35 during upward and downward movement of blade 38.

It will be noted that toe 32 is cut out beneath notch 35 to provide recess 43 under notch 35 in which the lower extremity 42 of blade 38 may freely move vertically.

At the upper extremity of blade 38 plates 39 and 40 are preferably converged at 44 and provided with a vertically extending, bored stud 45, the lateral edges of which are flattened. The inner surface of the upper extremity of blade 38 is referably smoothly curved, as shown, at 46, to conform with the upper, curved surface 47, of the forward edge 36 of blade B, from which it is spaced at a distance greater than the "throw" of blade 38, preventing contact between surfaces 46 and 47.

Paired link members 48 and 49 are preferably provided with bores 50 and 51 in their lower extremities which are applied over bored stud 45, a bolt 52 being passed through bores 50 and 51 of link members 48 and 49 to pivotally affix their parallel lower extremities at each side of stud 45.

Parallel links 48 and 49 are preferably joined at their upper extremities by a cross bar 53 provided at its center surface with rectangularly disposed, upwardly extending screw-threaded bolt 54 designed to be threadedly engaged within extended projection 30 at the lower periphery of eccentric housing 24, disposed about eccentric 25 and shaft 19, above the leading edge of blade B, as will hereinafter be further discussed.

As will be seen from FIGS. 1 and 2, the pivotal connection between the lower ends of links 48 and 49 and stud 45 at the upper extremity of blade 38 is preferably positioned just beneath beams 11 and 12, well above the surface of the ground in which the cut is being made, to obviate any possibility of the lower end of the linkage striking the ground. Further, as shown, links 48 and 49 are preferably appreciably longer than the height of beams 11 and 12.

Blade B, as shown in FIG. 2, is cut back or recessed at its upper, forward extremity to provide space 37 therein in which links 48 and 49 are free to move vertically.

Referring to the embodiment shown in FIG. 6, designed to lay wire, cable or tape, cutting blade 38 is shown with a sharpened, forward edge. Cable housing 55 is shown, extending the length of the rear edge of blade B and enlarged rearwardly at its lower extremity in pulley housing 56 provided with pulleys 57 designed to allow free passage of cable 58 outwardly from the open, rear extremity of housing 56.

The range of oscillation of cutting blade 38 on the edge 36 of blade B is preferably relatively short, depending upon the length of the blade B. The travel of blade 38 is twice the length of the offset of eccentric 25. Thus, if eccentric 25 is offset ½" on shaft 19 the downward and upward travels of blade 38 will be 1", for each rotation of eccentric 25. Thus, the length of travel of blade 38 may be directly controlled by the amount of offset of eccentric 25.

Even such a short oscillating range of blade 38 greatly implements the penetration of the blade through the ground and reduces materially the power required to pull the blade through the ground. The longer blade B, the longer should be the travel of blade 38.

The speed of oscillation of the cutting blade 38 is controlled by the speed of the motor 15 and eccentric 25. Speed may be regulated by varying the size of motor pulley 16 and driven pulley 18 at the extremity of eccentric shaft 19. In the embodiment illustrated, drive pulley 16 of motor 15 is multiple, each pulley surface decreasing in circumference, from inner to outer pulley. As shown in FIG. 1, driven pulley 18 is provided with equal peripheral grooves, aligned with the grooves of drive pulley 16, whereby the shifting of drive belt 17 in the pulley grooves will control the speed of eccentric 25. Reducing the diameter of drive pulley 16 and increasing the diameter of driven pulley 18 will decrease the rotational speed of eccentric 25 and thus decrease the speed of oscillation of blade 38.

Extremely rapid oscillation of blade 38 is not necessary, as comparatively slow oscillation thereof greatly increases the cutting efficiency of the blade. Normally, when the cut is being made in comparatively soft ground, a comparatively slow rate of oscillation of blade 38 is desirable and only when penetration is being made in comparatively rocky or heavily compacted ground is a higher oscillation rate desirable. For normal operations, an oscillation rate of between 200–300 per minute appears to be the optimum rate.

In addition to the great increase in cutting efficiency, the oscillating blade 38 also reduces vibration effect in the ditching blade to an absolute minimum, thus eliminating vibration damage to sensitive wire, tape or cable being laid, which would occur if the entire blade were oscillated or vibrated.

As has previously been indicated, the cutting edge of blade 38 is preferably provided with spaced teeth or projections to produce a "sawing" action on the ground being penetrated, but its surface may be merely sharpened, as shown in FIGS. 3, 4 and 6, where the blade is being used to penetrate comparatively soft or sandy soil without many obstructions.

If desired, the motor 15 may be eliminated and a power take-off shaft and gearing system from the power plant of the tractor may be utilized to rotate shaft 19 and eccentric 25. Here again, appropriate adjustment of the gear train from the power take-off shaft to drive shaft 19 may be utilized to regulate the speed of rotation of eccentric 25 and thus the speed of oscillation of blade 38.

Numerous alternative embodiments of eccentric 25 may be utilized, and as aforesaid, rotation of the eccentric may be produced in many well known ways without departing from the spirit of this invention.

The length of blade B and oscillating blade 38 may be varied within wide limits, depending upon the nature of the terrain, the depth of cut desired and the nature of the wire, cable, pipe or other material being laid.

For most normal operations, blade B is on the order of 30″ in length by 1″ in thickness, but these dimensions and those of blade 38 may be widely varied.

With the present installation, as the ditching blade B remains in fixed vertical position and as cutting blade 38 merely oscillates upwardly and downwardly along the forward edge of the main ditching blade no damaging vibration is set up in the main blade which would have a deteriorating effect either on the wire or cable being laid or upon the operating equipment driving the cutting blade.

As has been previously indicated, the rear edges of plates 39 and 40 of blade 38 preferably extend beyond the side walls of ditching blade B and thus eliminate packing of the soil thereabout and further implement the passage of the blade structure through the ground.

Throughout, mechanical equivalents may be substituted for the elements of this combination without departing from the spirit of the invention.

This specification is by way of illustration of certain embodiments of the invention and nothing therein is intended to limit the scope of the invention.

What is claimed is:

1. In a ditching and cable laying machine, a wheeled vehicle body, a main ditching blade affixed at its upper extremity centrally of the rear end of the vehicle body and extending downwardly therebeneath, penetrating the surface of the ground, a V-shaped forward edge on said main ditching blade, a penetrating toe provided at the forward, lower extremity of said main blade, a V-shaped cutting blade closely and slidably fitted over the forward edge of said main blade and vertically movable thereon, means at the upper, rear extremity of said toe engaging the lower, forward extremity of said V-shaped cutting blade, a rotating eccentric mounted on the vehicle body above the forward edge of said main blade, drive means on said vehicle rotating said eccentric, means pivotally connecting said eccentric with the upper extremity of said cutting blade whereby rotation of said eccentric will produce a vertical, reciprocating movement of said cutting blade.

2. A structure in accordance with claim 1 in which the toe of said main blade is provided with a V-shaped notch at its upper, rear extremity in which the lower, forward edge of said V-shaped blade closely and slidably engages.

3. A structure in accordance with claim 1 in which the forward edge of said V-shaped cutting blade is provided with teeth.

4. A structure in accordance with claim 1 in which the forward edge of the cutting blade is provided with spaced welding beads.

5. A structure in accordance with claim 1 in which said eccentric comprises an off-center, cylindrical disc mounting on a driven shaft within a housing, the lower extremity of the housing being connected to the upper extremity of said cutting blade by link means.

6. A structure in accordance with claim 1 in which the drive means for said eccentric comprises a motor, the drive pulley of which is connected to a pulley on the eccentric shaft by means of a belt.

7. A structure in accordance with claim 1 in which the drive to the eccentric is by means of a power take-off from the power plant of the vehicle.

8. A structure in accordance with claim 1 in which the cutting blade is provided over the length of the forward edge of said main blade, beneath the vehicle body.

9. A structure in accordance with claim 1 in which the reciprocating movement of the cutting blade is comparatively short.

References Cited

UNITED STATES PATENTS 3,326,009   6/1967   Gagne _____ 172—40 X
3,202,222   8/1965   Norris _____ 172—699 X

FOREIGN PATENTS 2,219   3/1915   Great Britain.

ROBERT E. BAGWILL, Primary Examiner

STEPHEN C. PELLEGRINO, Assistant Examiner

U.S. Cl. X.R.

37—193; 61—726; 172—101